United States Patent

Jeffryes

Patent Number: 5,933,790
Date of Patent: Aug. 3, 1999

[54] DATA COMPRESSION FOR SEISMIC SIGNAL DATA

[75] Inventor: Benjamin Peter Jeffryes, Histon, United Kingdom

[73] Assignee: Schlumberger Technology Corporation, Sugar Land, Tex.

[21] Appl. No.: 08/860,888

[22] PCT Filed: Dec. 15, 1995

[86] PCT No.: PCT/GB95/02932

§ 371 Date: Sep. 23, 1997

§ 102(e) Date: Sep. 23, 1997

[87] PCT Pub. No.: WO96/20451

PCT Pub. Date: Jul. 4, 1996

[30] Foreign Application Priority Data

Dec. 23, 1994 [GB] United Kingdom .................. 9426088

[51] Int. Cl.$^6$ ..................................... G06F 19/00
[52] U.S. Cl. ............................................. 702/17
[58] Field of Search ................ 702/17, 16, 14; 367/43, 44, 45, 74

[56] References Cited

U.S. PATENT DOCUMENTS 4,312,050  1/1982  Lucas ........................................ 367/44
4,509,150  4/1985  Davis ........................................ 367/76

FOREIGN PATENT DOCUMENTS 1377594  12/1974  United Kingdom .

Primary Examiner—Donald E. McElheny, Jr.
Attorney, Agent, or Firm—Kieth G.W. Smith; Peter Y. Lee

[57] ABSTRACT

Methods and apparatus are described for compressing seismic data. The data compression is achieved by splitting the data into subsets and applying requantization levels to those subsets which depend on a number representing the subset and on time. Further error criteria ensure that the error introduced by the data compression does not affect the data in a time window representing the listening time. The compression ratio can be improved by applying data encoding techniques to the subsets.

14 Claims, 7 Drawing Sheets

DATA COMPRESSION FOR SEISMIC SIGNAL DATA

The present invention relates to methods and apparatus for compressing seismic signal data, in particular data representing uncorrelated vibroseis traces.

BACKGROUND OF THE INVENTION

In land seismic acquisition (both on the surface and in boreholes) a common seismic source is vibroseis: A vibrating mass on a baseplate provides a seismic signal whose frequency is varied slowly with time. For example, the frequency might be swept between 10 and 100 Hz over 8–20 seconds. The two-way travel time to the target (for surface seismics), or one-way time (for borehole seismics) will be much less than this—in exploration typically 1–4 seconds. The duration of the trace transmitted from each geophone must be at least the sweep time plus the travel time. If each trace is to be individually recorded far more data points will be required than for an impulsive source, where the trace duration is the travel time.

Because of this in most circumstances the raw traces are not recorded. The traces are cross-correlated with a trace representing the nominal sweep and (if a number of sweeps have been made from one site or closely spaced sites), these cross-correlations are summed. Only the summed cross-correlations between zero and the travel time are recorded.

It is therefore an object of the invention to provide methods and apparatus for compressing seismic data, in particular seismic data which represents vibroseis traces.

SUMMARY OF THE INVENTION

The objects of the invention are achieved by methods as set forth in the appended claims.

It is an important feature of the invention to split the original data set into several bands by steps of filtering and subsampling, and repeating those steps until the desired number of subset is generated. Each subsequent subset or higher band is generated by applying a filtering step to the remaining signal of the previous subsampling.

It is seen as a further important element of the invention that for each band, a requantization level is chosen. Thus the requantization levels effectively depend on two variables, i.e., band number and time. As a result, they can be represented by a two-dimensional template, hereinafter also referred to as requantization template.

In principle the splitting in subset is an arbitrary process depending only the definition of the filters. In case that those filters are designed as band-pass filters, the splitting leads to a frequency splitting of the original data set.

Further embodiments of the invention differ in how those requantization levels are derived.

In another preferred embodiment a further compression step is applied to the subsets.

The data sets generated by the compression are particularly useful for data transmission, e.g. from the seismic receiver (geophones, hydrophones) to a first data gathering and analysing station, which could be mobile and located close to the receivers, or from a mobile station to a data centre. The compressed data can transmitted via cables, radio transmission, or satellite. The invention can also be advantageously used for storing seismic data.

The invention further describes how to compress the original vibroseis trace in such a way that the windowed cross-correlation of the decompressed trace and the sweep is identical to the cross-correlation of the original trace and the sweep, but the remainder of the decompressed trace is of reduced accuracy. There is flexibility in the invention. For instance if noise in a particular frequency band can be removed before correlation, this noise can be recorded with the required accuracy over the whole acquisition time.

The method to be used is very similar to that employed in compression of audio data using band-splitting. In these techniques the audio signal is split into a number of frequency bands. The ear's sensitivity to different frequency bands varies, and so the original data quantization level is retained only in the band of greatest sensitivity. The quantization level of the data in the other bands is increased to the highest level at which there is no perceivable degradation in the reconstructed signal.

For vibroseis signals the equivalent of the listener is the cross-correlation. The vibroseis signal is split into frequency bands. The quantization level within each band is varied with time in such a way that when reconstructed and cross-correlated no error results in the required time window. Having requantized the signal further compression techniques can be used. The scheme's flexibility comes by adjusting the quantization levels. If an additional criterion is used (such as reconstruction accuracy level for a particular noise spectrum), the quantization at each time can be set as the maximum of the levels.

MODE(S) FOR CARRYING OUT THE INVENTION

Figure 1:
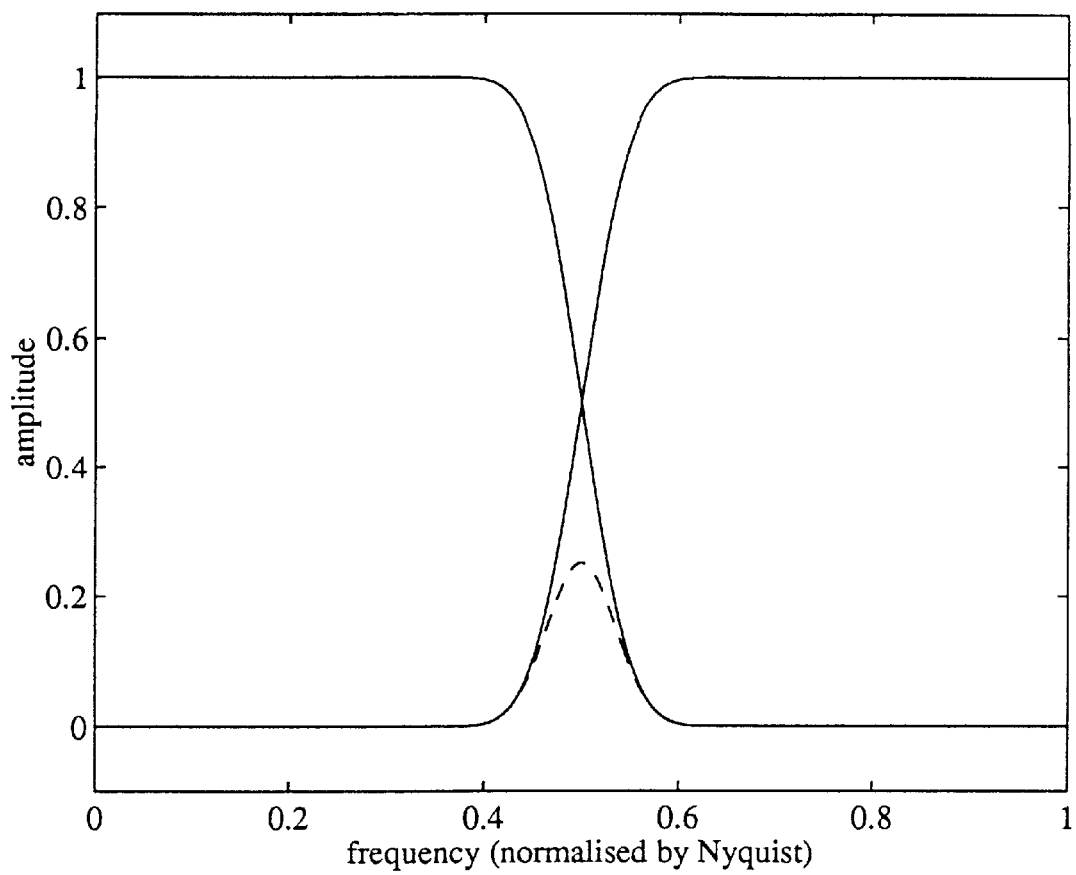
FIG. 1 shows the power spectra of a pair of high and low pass mirror filters (solid lines), together with the power spectrum of their convolution (dashed line).

The vibroseis source is a controllable shaker. The normal mode of operation is to sweep the shaker over a frequency band (for operational reasons an upward sweep is normal). Normally a flat force level is intended over the frequency band, with smooth ramps up and down at the ends of the sweep. The force function (s(t)) is given as a function of time by $$s(t) = Fw(t) \sin\{2\pi a(t)\} \quad [1]$$

where F is the sweep amplitude, w(t) is a windowing function and a(t) is the sweep phase angle. The windowing function w(t) has the form $$w(t) = \begin{cases} 0, & \text{for } t < 0 \\ 1, & \text{for } \tau < t < T - \tau \\ 0, & \text{for } t > T. \end{cases} \quad [2]$$

For $0 < t < \tau$, the window function w(t) is an upward ramp, for $T-\tau < t < T$ it is a downward ramp.

The angle function a(t) has the form $$a(t) = \int_0^t f(t_1) dt_1 \qquad [3]$$

where f(t) is the instantaneous frequency. If the sweep is linear then $$f(t) = f_1 + \frac{t}{T}(f_2 - f_1). \qquad [4]$$

For an upward sweep $f_2 > f_1$, for a downward sweep $f_2 < f_1$. All the sweeps used in the present example are upward sweeps.

If the impulse response from the vibroseis location to a geophone is I(t), then the signal received at a geophone g(t) is given by the convolution integral of I(t) and s(t) as given by equation [1].

The portion of the signal of interest is that corresponding to 0<t<L where L is the listening time, and hence although the signal contains frequencies from f(0) to f(t), the bandwidth of the interesting part is only from f(t-L) to f(t).

Thus at any time the interesting part of the signal is band-limited, but the band of interest changes with time. For a linear sweep the band-width is constant (apart from start and finish effects). For a non-linear sweep the band-width will vary.

The idea behind sub-band sampling is simple. Given a signal with bandwidth F, sampled at its Nyquist frequency 2F, convert it into B sub-signals, each with bandwidth F/B and sampled at 2F/B. For this process to be useful it must be fully reversible so that the original signal may be reconstructed from the B band-limited sub-signals.

For the case $n=2^m$ for some integer m this process can be done computationally efficiently through the use of mirror filters (the term quadrature mirror filtering (QMF) is usually used, sometimes conjugate quadrature filtering (CQF)). A good reference on QMF theory and design is found in M. J. T. Smith/T. P. Barnwell III, IEEE Trans. Acoust.Speech and Sig. Process. ASPP-34, 434–441(1986). There are many ways of performing time-frequency decomposition of data, of which QMF filtering is just one, cf. Y. Meyer, Wavelets Algorithms and Applications (transl. and rev. by R. D. Ryan), SIAM (1993). QM filters provide good frequency localization, at the expense of some spreading in time, a combination that suits their application in vibroseis compression where the data is frequency band limited.

In mirror filtering a signal is split into two using a high-pass and low-pass finite impulse response (FIR) filter. Every other sample is then removed (alternatively every other sample is not calculated). To reconstruct the original signal the sub-signals are expanded by inserting zeros between each data point, filtered using FIR filters, and added together. With correctly designed filters this process is exact. The reconstruction filters are the time-reverse of the splitting filters.

The filters are termed mirror filters because the power spectrum of the high-pass filter is the power spectrum of the low-pass filter 'mirrored' at half the Nyquist frequency. By definition the power spectra must have the same value of 0.5 at half the Nyquist frequency, so there must always be some overlap in the frequency response of the two filters. This is shown in FIG. 1.

Figure 2:
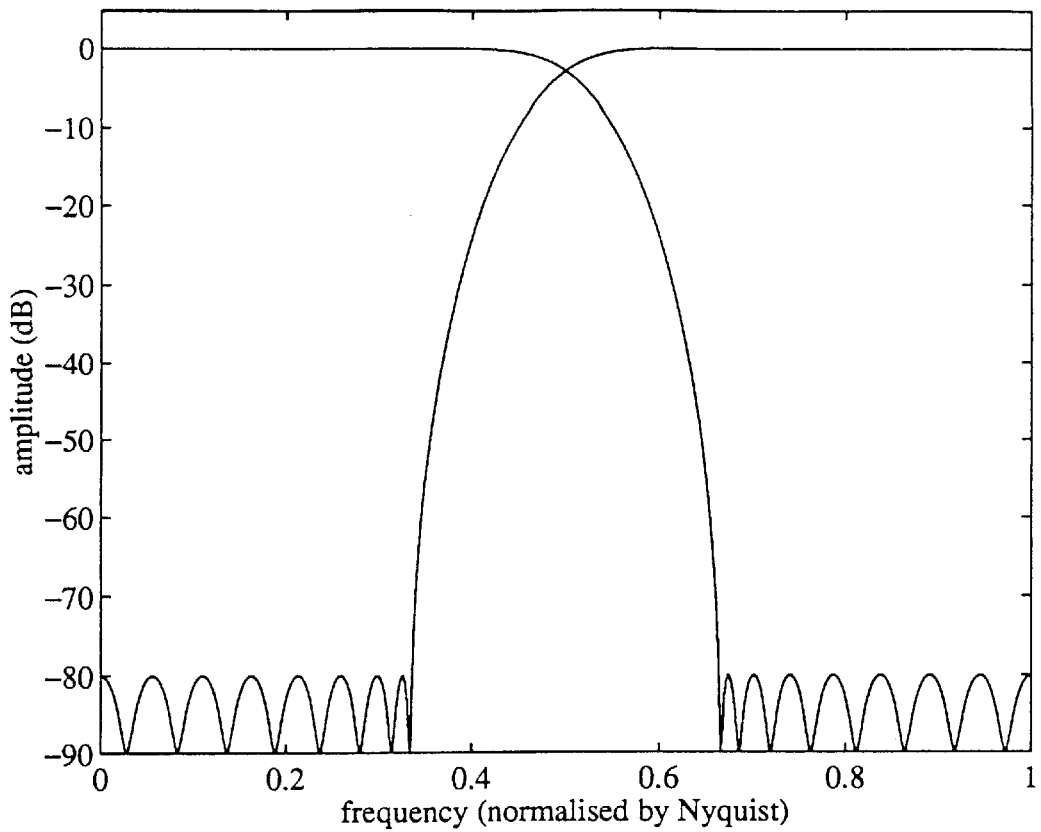
FIG. 2 shows the power spectra of the high and low pass mirror filters of FIG. 1 on a dB scale.

FIG. 2 shows power spectra of the high and low pass filters on a dB scale. The filters have been designed to have a 80 dB attenuation in the stop bands. The attenuation in the stop band of the high pass filter is the same as the ripple in the pass band of the low pass filter, which enables the exact reconstruction of the original signal from the filtered sub-signals. The filters whose power spectra are shown in FIG. 2 have 32 elements.

In order to split the signal into $2^m$ sub-signals, the splitting operation is repeated m times. The same applies for the reconstruction.

Figure 3:
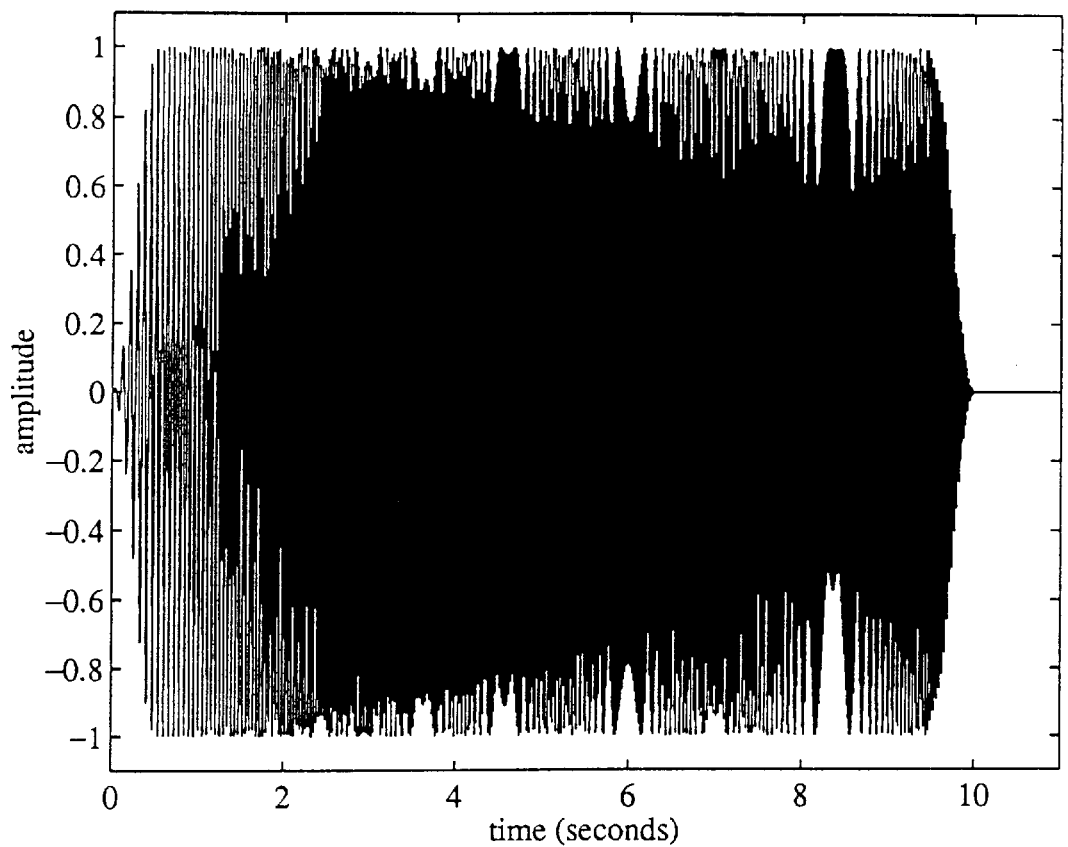
FIG. 3 shows a unit-amplitude sweep of a modelled vibroseis source from 10 to 90 Hz over 10 seconds with 0.5 second tapers.

FIG. 3 shows a 10 second sweep from 10 to 90 Hz. The sweep has unit amplitude over the whole length of the sweep, apart from the short ramps at the beginning and end. The data have been sampled at 250 Hz (4 ms).

Figure 4:
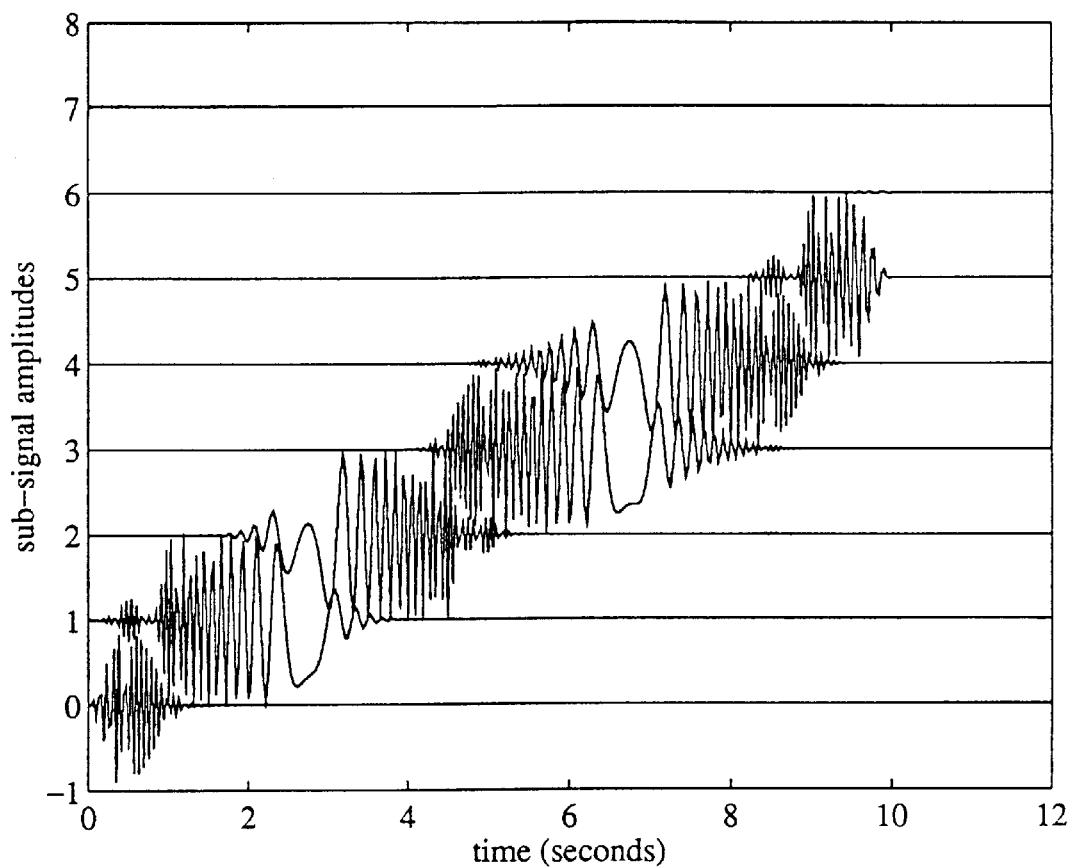
FIG. 4 shows the sweep of FIG. 3 split into 8 sub-bands.

FIG. 4 shows the same sweep split into 8 bands using mirror filters. Within each band the signal is confined to a short time interval, about 4 seconds. It is worth noting both that the intervals in adjacent bands overlap, and this can cause visible amounts of signal to be present at other times. The top two bands contain very little data, since they cover the frequencies 96–128 Hz which are above the top sweep frequency.

Figure 5:
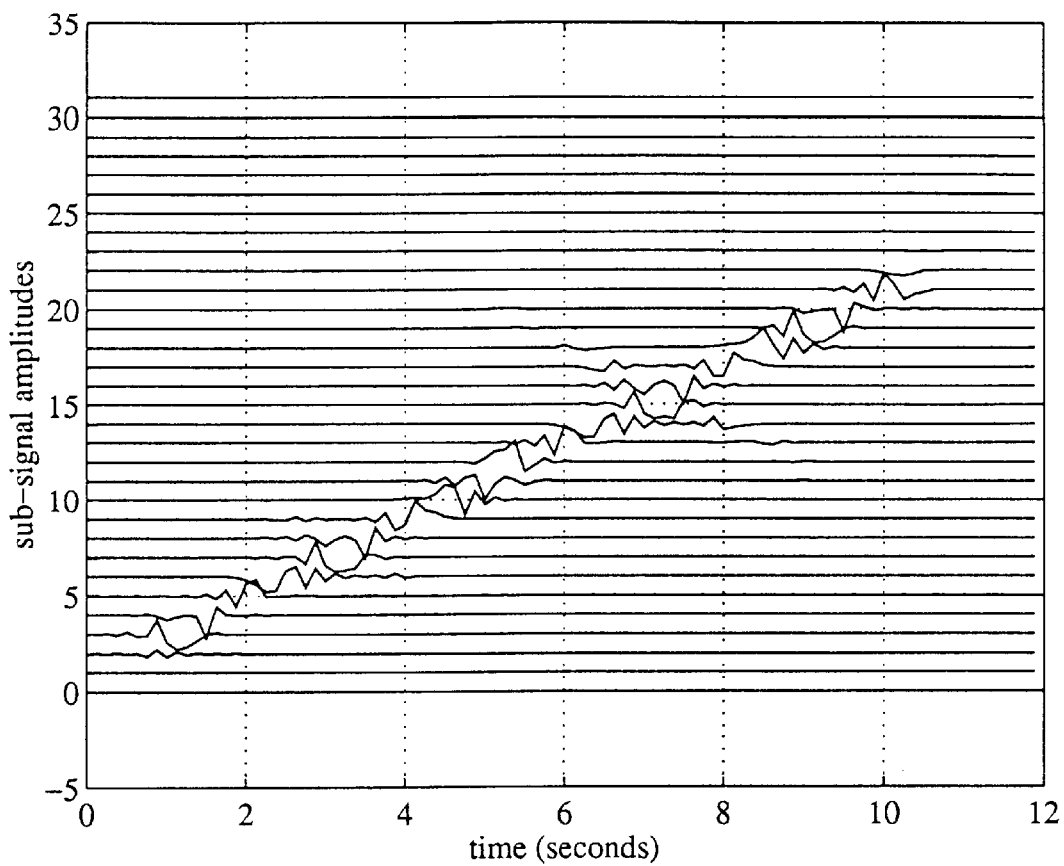
FIG. 5 shows the sweep of FIG. 3 split into 32 sub-bands.

FIG. 5 shows the same sweep split into 32 bands using the same filters. The effects of filter overlap are quite clear as diagonals on the plot near the centre frequency.

Comparing FIG. 3 and FIG. 5, it is clear that the signal has been concentrated quite efficiently into a reduced number of data points, since the 32 band limited signals contain largely near zero numbers. This can be quantified by looking at the mean number of significant bits needed to represent the original sweep and the band-limited subsignals. If the original sweep were quantized using 24 bit fixed point (fixed gain) arithmetic then there are an average of 23 significant bits/data point in the original signal. In the band-limited sub-signals, there are 9 significant bits/data point on average.

Having split the original signal into band-limited sub-signals, these sub-signals may be requantized. The objective is to requantize at as high a level as possible, without introducing errors into the signal that will appear in the first L seconds of the cross-correlation of the signal with the pilot sweep.

Let the original signal be S(j), with j=1, . . . ,N. This is split into B sub-signals $s_i(j)$, j=1, . . . ,n, where n=N/B. If element $s_i(J)$ is requantized at a level E, which is higher than the original quantum, then errors with a maximum amplitude of E will be introduced into the sub-signal. To see whether this has an effect on the first L seconds of the cross-correlation, larger than the original quantization error, we need to know the transfer function from a set of sub-signals $t_i^{IJ}(j)$ to the first L seconds of the cross-correlation, where $$t_i^{IJ} = 1 \text{ for } i=I, j=J, \text{ and} \qquad [5]$$

$$t_i^{IJ} = 0 \text{ for } i \neq I, j \neq J. \qquad [6]$$

If the maximum amplitude of this transfer function is less than 1/E then requantization of element $s_I(J)$ will have an effect less than the original quantization error. Of course a smaller requantization level can also be chosen, if other criteria are to be satisfied.

It is very laborious to calculate the maximum possible requantization level for each sub-signal element, although for any set of QM filters and sweep this need be done only once. A short cut is to split the sweep into sub-signals and use the amplitude of these sub-signals to determine requantization levels.

If the first L seconds of the cross-correlation are to be reproduced then copies of the sweep delayed between zero and L seconds are split. Let $a_i(j)$ be the maximum amplitude of sub-signal i, time position j for sweeps delayed between 0 and L seconds. Then the maximum requantization level of a geophone response necessary to preserve the first L seconds of the cross-correlation is $1/a_i(j)$. In example calculations this method gives virtually identical results to direct calculation of transfer functions. In order to eliminate phase effects in the calculation of amplitudes for setting the quantization levels it may be best to split a complexified version of the sweep. To demonstrate how the method works it is also easiest to work with complex numbers.

Figure 6:
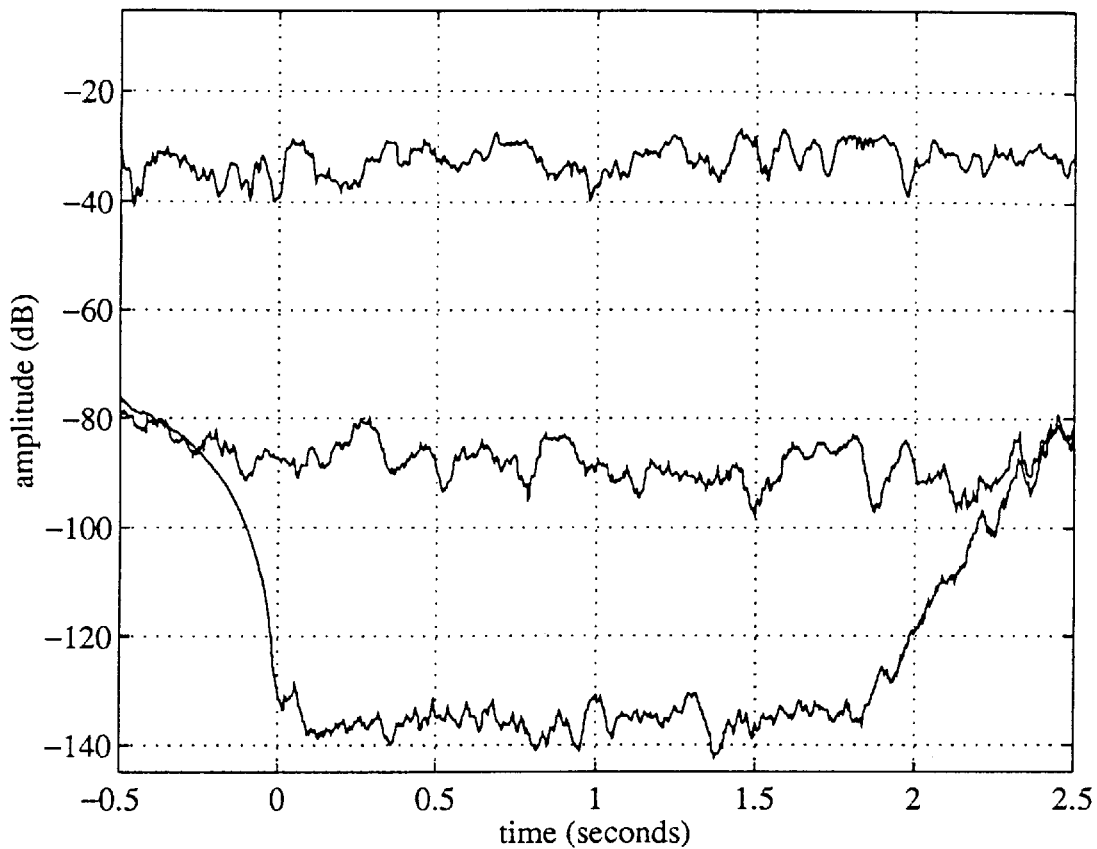
FIG. 6 shows the cross-correlation error due to phase variations in the test signal (pilot sweep).

Compression using the pilot sweep as a quantization template does more than mirror the content of the windowed cross-correlation. For instance, if the true sweep has some phase variation, and this is recorded, then the reconstructed signal can be cross-correlated with the true sweep with reduced error. This is shown in FIG. 6. The top line shows the relative error in the cross-correlation produced by a phase variation with a standard deviation of 2 degrees. As expected it is at about the −30 dB level. The middle line shows the relative error when the true sweep is cross-correlated with a reconstructed sweep, where the pilot sweep has been used to determine the requantization. The error is reduced but above the −135 dB level achieved by calculating the requantization level from the amplitudes $a_i(j)$ because there is less localization of the true sweep when split into bands than for the pilot sweep. The bottom line shows the effect of allowing for variation in phase in determining the quantization. The overhead in this is about 1 bit/data point for a 2 degree standard deviation in phase.

If the geophone response is to be deconvolved using a deconvolution operator for a measured sweep that contains harmonics then a similar result holds. A reconstructed response, using the pilot sweep as the template, gives a result after deconvolution very close to that obtained using the un-compressed response. Again this applies only during the listening time.

If information about uncorrelated noise is to be recorded then a minimum requantization level can be set either for the entire frequency range or for a limited frequency band.

The compression achievable by the use of a requantization template does not depend on the actual data. The data are requantized with a fixed number of bits being discarded. Once this has been done further compression can be achieved, but the amount of compression will depend on a number of factors, such as the signal and noise levels and the number of geophone traces to be compressed in one packet.

The compression has been tested on vertical geophone recordings of a vibroseis sweep. The record length is 14 seconds and the sweep is 5 Hz–100 Hz over 10 seconds, hence the listening time is 4 seconds. The data are stored as 32 bit floating point numbers, and were converted into a 24 bit fixed point representation.

Two groups each comprising six geophones at 2 m spacing were used to test the compression scheme, one group at near offset (38–48 m), the other at far offset (580–590 m). The data were not recorded using 24 fixed gain recording, and so there was a choice to be made in scaling the data. For the near data set full amplitude was chosen as the maximum amplitude of the data. Similarly for the far data set. This data set was also compressed taking full amplitude as being the maximum amplitude of the 'near' data, so none of the data are near full range. These data will be referred to as 'low' data.

The data were recorded using 1 ms sampling although the maximum frequency present in the sweep was 100 Hz, so compression was performed both on the raw data and data filtered and resampled at 2 ms and 4 ms. The data were split into bands with a nominal width of 125/32 Hz, hence the 1 ms data used 128 bands, the 2 ms data used 64 and the 4 ms data used 128.

The additional compression used Huffman encoding of amplitudes. For each data point the number of leading zero bits used in representing the largest amplitude among the 6 geophones was found, and the probability distribution of bits used to devise a Huffman code for the number of leading zeros. The code is transmitted before the data, but this imposes only a small additional overhead (less than 0.05 bits/sample). A more complete description of the entire compression algorithm is given in appendix B.

The mean number of bits/sample after compression was calculated and is shown in the following table 1:

|  | Sampling rate | | |
| --- | --- | --- | --- |
| Data set | 1 ms | 2 ms | 4 ms |
| Near | 1.8 | 3.4 | 6.0 |
| Far | 3.2 | 6.2 | 10.1 |
| Low | 1.0 | 1.8 | 3.4 |

If instead of uncorrelated data the first four seconds of the cross-correlation were transmitted (uncompressed), then the equivalent number of bits/sample is 6.9.

Another useful statistic is the number of bits/millisecond/geophone, since this is an indication of the bandwidth necessary per geophone in data transmission. This is shown in the following table 2:

|  | Sampling rate | | |
| --- | --- | --- | --- |
| Data set | 1 ms | 2 ms | 4 ms |
| Near | 1.8 | 1.7 | 1.5 |
| Far | 3.2 | 3.1 | 2.5 |
| Low | 1.0 | 0.9 | 0.9 |

As expected the faster the sampling the higher the bit rate, however it is clear that the overhead from faster sampling is low. 1 ms sampling requires a bit rate about 20% higher than 4 ms sampling. Since the cross-correlation using 1 ms data contains no more information than the 4 ms data (the maximum sweep frequency is 100 Hz) a perfect compression scheme would result in the same bit rate. A 20% overhead shows that the compression scheme is very efficient and over-sampled vibroseis data can be delivered at little extra cost in bandwidth.

Table 3 shows the effect on compression of using a maximum requantization level set by the data:

|  | Sampling rate | | |
| --- | --- | --- | --- |
| Data set | 1 ms | 2 ms | 4 ms |
| Near | 1.8 | 3.5 | 6.1 |
| Far | 4.0 | 6.9 | 10.3 |
| Low | 2.9 | 4.6 | 6.0 |

In this example it has been set as 10 bits less than the maximum amplitude in the 6 band-split data records. For the Near and Far data sets this is $2^{14}$ above the 1 bit level since the data is full range. For the Low data set it is $2^5$ above the 1 bit level since the maximum amplitude in the data is of order $2^{-9}$.

The computational overhead as required by the described example is limited as the quadrature mirror filtering can be carried out efficiently, since those elements that are removed by decimation need never be calculated. Similarly, during reconstruction the multiplications by interpolated zeros need never be performed. The number of floating point multiplications necessary can be calculated quite simply.

At each stage in the filtering there are the same number of data points (assumed to be N). Each filtered output point comes from applying an FIR filter (length n), and hence N times n multiplications are required. To split into B bands, if B is a power of 2 then a grand total of $Nn\log_2 B$ multiplications are required. In the case considered in section 2 with 32 bands and a 32 element filter this is 160N. Clearly the computation increases with number of bands and length of filter. Since compression performance also increases with these, in practice there will be a balance to be struck between computational load and compressional performance.

This needs to be compared with the computation required for cross-correlation using Fourier transforms. To calculate this a data length needs to be chosen. The parameters used in the example sweep (10 second sweep, 2 second listening time, 250 Hz acquisition), result in 4800 points. To perform the cross-correlation correctly this must be padded with an equal number of zeros, and then further padded up to an integral power of 2—in this case to 16384 points. To calculated the cross-correlation it must be Fourier transformed, multiplied pointwise by the conjugate transform of the sweep and inverse transformed. Fourier transforms require $L\log_2 L$ operations, where L is the transform length, and hence the total number of multiplications required is $L(2\log_2 L+1)$. In this case it is 29L, or 99N.

As this example shows the number of multiplications required is comparable with but greater than the number needed for a cross-correlation. As with Fourier transforming, the calculations should be performed with a greater precision than is present in the initial data. Converting the data to double-precision floating-point before filtering, and back afterwards provides more than sufficient accuracy.

In the following a way of constructing QM filters is shortly described.

QM filter construction is similar to other methods of designing FIR filters with prescribed properties. The difference is that the filter, once designed, is 'split' into two, the high and low pass filters. The method described here is based on M. J. T. Smith/T. P. Barnwell III, IEEE Trans. Acoust. Speech and Sig. Process. ASPP-34, 434–441(1986), to which reference for the theory behind the construction is made.

The FIR filter that must be constructed is the product of the low-pass splitting filter and the high-pass reconstruction filter.

The first stage is to find a symmetric polynomial V(z) (an order M polynomial is symmetric if the nth coefficient is equal to the ((M+1−n)th) of the right order that passes through the origin and also obeys $V(e^{i\Theta})+V(-e^{i\Theta})=0$. This implies that the product filter will be anti-symmetric about the half-Nyquist frequency. Looked at as a polynomial in $\cos(\theta)$, V is a polynomial in odd powers of $\cos(\theta)$. With $W(\cos(\theta))=V(e^{i\Theta})$, and assumed the final filter length is to be N, then W is an order (N−1) odd polynomial with real maxima and minima whose maxima are all less than ½ and whose minima are greater than ½-ϵ where $-10\log_{10}\epsilon$ is the desired stop-band attenuation in dB.

Finding a polynomial that fits these criteria can be done using the Hofstetter method, cf. E. Hofstetter/A. Oppenheimer/J. Sigel, Proc. of the 5th annual Princeton Conf. Inform. Sci. Sys. pp. 64–72 (1971) or A. V. Oppenheimer/R. W. Schafer, *Digital Signal Processing*, Prentice Hall (1975). An initial guess is made at the points through which the polynomial will attain its maxima and minima, and (using Lagrange interpolation) the unique polynomial is constructed that has the desired values of maxima (less than ½, e.g. ½-ϵ/10) and minima (e.g. ½-ϵ) at these values. This polynomial will pass through these values, but will have its maxima and minima elsewhere. For the next guess the actual locations of the maxima and minima are used as the interpolation coordinates, with the polynomial constructed to have desired maximum and minimum values there. This is repeated until the polynomial's maximum and minimum values are within the desired bounds. Although no proof exists that this procedure converges, in practice with a sensible initial guess at the locations of the maxima and minima the procedure quickly produces a polynomial with the right properties. The Lagrange interpolation process involves inverting a badly-conditioned matrix so there are limits on the stop-band attenuation and filter length that can be practically achieved using double-precision arithmetic (I have been unable to construct filters with more than 40 elements, and the attenuation limit for a 32 element filter is around 90 dB). Since the product filter has twice the attenuation of the individual high and low-pass filters it may be possible to circumvent these limits by using higher-precision arithmetic to construct the product filter, and to then revert to double-precision for the final filters.

Given a W with the correct maxima and minima we may construct the product filter polynomial F, defined by $$F(e^{i\theta})e^{-((N-1)i\theta)} = W(\cos(\theta)) + \frac{1}{2}, \qquad [7]$$

for instance if $$W(\cos(\theta))=2\cos(\theta), \qquad [8]$$

then $$F(z) = 1 + \frac{1}{2}z + z^2. \qquad [9]$$

The polynomial F is a strictly positive function for all real θ. Now F is the product of the high and low pass QM filters. Its symmetry properties imply that $$\frac{F(z)}{z^N} = K\prod_{i=1}^{N}(z+z_m)\left(\frac{1}{z}+z_m\right) \qquad [10]$$

for some constant K. The polynomials corresponding to the analysis and reconstruction filters are given by $$H_0(z) = \left[\sqrt{K}\prod_{i=1}^{N}(z-z_m)\right]z^{-N} \qquad [11]$$

$$H_1(z) = \sqrt{K}\prod_{i=1}^{N}(z^{-1}+z_m) \qquad [12]$$

$$G_0(z) = \sqrt{K}\prod_{i=1}^{N}(z^{-1}+z_m) \qquad [13]$$

$$G_1(z) = -\left[\sqrt{K}\prod_{i=1}^{N}(z+z_m)\right]z^{-N} \qquad [14]$$

where $H_0$ and $H_1$ are the polynomials corresponding to the low and high-pass splitting filters, respectively, $G_0$ and $G_1$ those of the low and high-pass reconstruction filters.

The choice of which roots to use for the $H_0$ is arbitrary. If all the zeros of $H_0$ are within the unit circle then $H_0$ will be minimum phase, and $H_1$ will be maximum phase. The choice, following the suggestion of M. J. T. Smith/T. P. Barnwell III, IEEE Trans. Acoust. Speech and Sig. Process. ASPP-34, 434–441(1986), is to take alternating zeros inside and outside the unit circle. This choice gives nearly linear phase.

Converting from polynomials to time-domain filters (i.e. taking the polynomial coefficient), the filter coefficients are related by $$h_1(n) = (-1)^{n+1} h_0(N+1-n);\qquad [15]$$
$$g_0(n) = h_0(N+1-n);\qquad [16]$$
$$g_1(n) = (-1)^n h_0(n);\qquad [17]$$

with $1 < n < N$.

A signal split into 2 sub-signals and then reconstructed will have half the amplitude of the original signal, if $g_0$ and $g_1$ are not rescaled. This is because the interpolation procedure alternates the sub-signal with zeros before filtering. To produce the original signal the filters $g_0$ and $g_1$ must be multiplied by 2.

Figure 7:
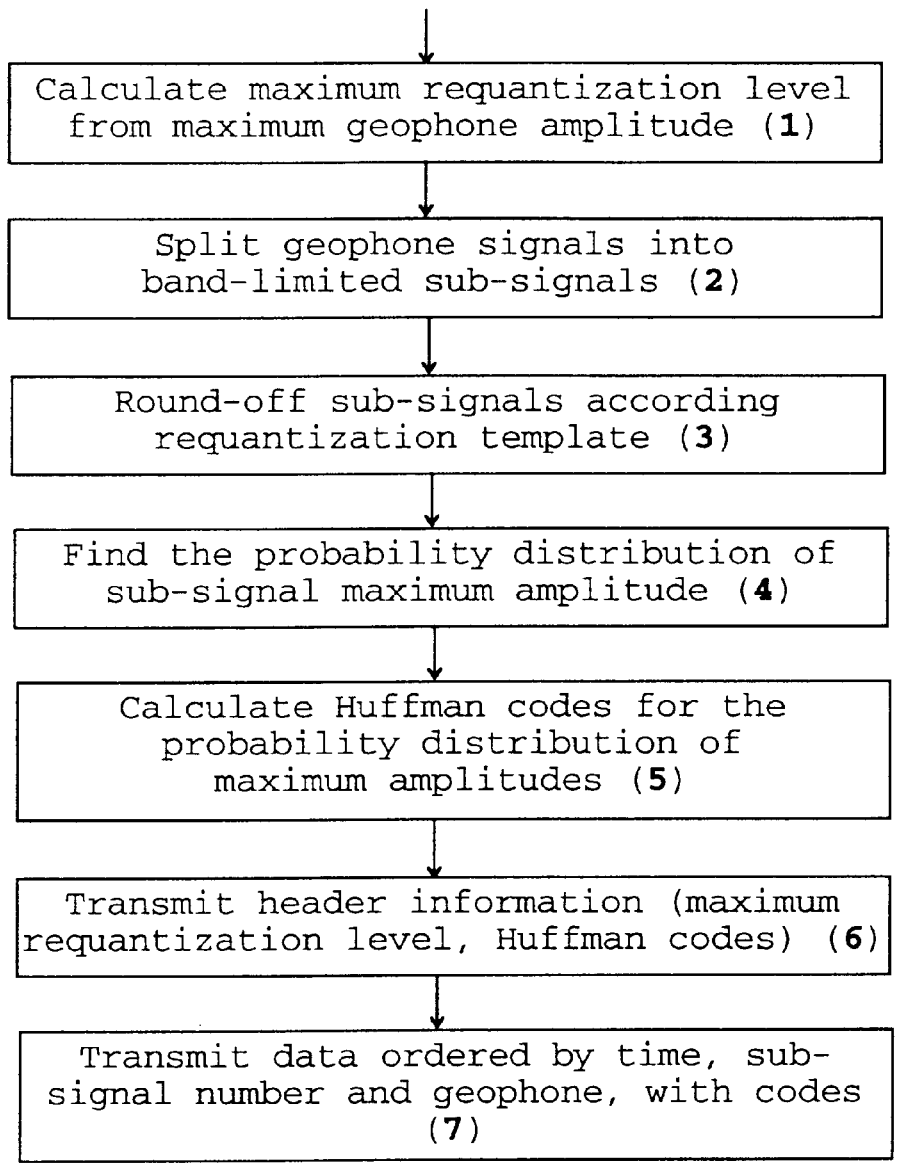
FIG. 7 shows a block diagram summarizing the basic steps in an example according to the invention.

FIG. 7 is a block diagram summarising the basic steps of a complete example in accordance with the present invention.

As a first step (1) of this example, the maximum requantization level from the maximum geophone amplitude is calculated. If there is a maximum requantization level to be set that is based on the data then the data cannot be requantized until all the data have been acquired. In the example shown in table 3 the maximum requantization level is set as 10 bits less than the maximum level amongst the receiver group of geophones (in this case 6 geophones) for one shot.

In a second step, the geophone signals are split into band-limited sub-signals. The geophone signals are repeatedly filtered and decimated using the QM filters. To eliminate start-up effects the data are periodically repeated. In the example all the data were split into sub-signals with a nominal width of 125/32 Hz, thus the 4 ms data were filtered 5 times, the 2 ms data 6 times and the 1 ms data 7 times. This is done for all the geophone signals that are to be processed together (6 in the example).

In a third step, the signals are round off or compressed in accordance with a requantization template. With the maximum requantization level, a requantization template can be constructed by taking the maximum of the stored template for the sweep, and the maximum requantization level. The sub-signals are requantized according to these levels.

The following three steps describe a further compression of the data using Huffman coding:
First a probability distribution for the sub-signal maximum amplitude is derived. Amplitude encoding compresses data by suppressing leading zeros for low-amplitude data. Data is transmitted in small groups, preceeded by a code that indicates the number of bits/datum. The optimal codes are calculated using Huffman coding and the code dictionary is transmitted with the data. An advantage of using this coding method is that the remote possibility of data elements requiring more than 24 bits may be easily accommodated. To calculate the Huffman code the probability distribution of the maximum number of bits/datum is required. With varying quantization levels either the maximum data amplitude within each group, or the maximum number of bits/datum may be encoded, since for non-zero data the difference between the two is the requantization template. In the example the data groups are the sub-signal elements for all 6 geophones.

Once the probability distribution is calculated from the data the appropriate Huffman code may be devised. The algorithm to calculate Huffman codes is straightforward and fast (C. M. Goldie/R. G. E. Pinch, *Communication Theory*, London Mathematical Society Student Text 20, Cambridge University Press (1991).

For transmission of the data, a header for data must contain information necessary to decode the message. If a maximum requantization level has been set that must be transmitted in order that the recipient can calculate the requantization template used. A list of the Huffman codes must also be sent in order that the amplitude codes can be used to distinguish one datum from the next. The code list requires very few bits compared to the total data volume.

As the last step, the data are in a predetermined order. In the example the data for 6 geophones at one time and band-number have been grouped together, and their maximum amplitude used to calculate the Huffman codes. To transmit this data first the code for the number of bits/datum (e.g. n) is sent, followed by the data itself (6n bits). A convenient order to sent these groups of data is ordered by band number and then time.

I claim:

1. Method for compressing seismic signal data, including the steps of:

splitting said seismic signal data into a plurality of data subsets by steps of filtering and subsampling; and requantizing said data subsets using requantization levels which depend on a variable characterizing a single one of said data subsets and a variable characterizing time.

2. The method of claim 1, wherein the requantization levels for the subsets are chosen such that, after a decompression and reconstruction step, the decompressed and reconstructed data have errors the maximum level of which is related to the maximum amplitude of said data.

3. The method of claim 1, wherein the requantization levels for the subsets are chosen in relation to the bandwidth of the seismic signal data to be compressed.

4. The method of claim 1, wherein the requantization levels for the subsets are chosen such that, after a transformation step applied to the seismic signal data, the error of said seismic data is less than or equal to a predetermined limit in a time window of said transformed seismic signal data.

5. The method of claim 1, wherein the requantization levels for the subsets are chosen such that, after a transformation step applied to the seismic signal data, the error of said seismic data is less than or equal to an original quantization error of the seismic signal data in a time window of said transformed seismic signal data.

6. The method of claim 5, wherein the transformation step includes a cross-correlation of the seismic signal data with a pilot sweep signal of a vibratory seismic source.

7. The method of claim 1, further including the step of acquiring the seismic signal data by using a vibratory seismic source.

8. The method of claim 1, further comprising the step of encoding requantized subset data.

9. The method of claim 1, further comprising the step of encoding requantized subset data using Huffman encoding of Maximum Amplitudes, or mathematical equivalents thereof.

10. The method of claim 1, further comprising the step of transmitting the data in a format including a data section and a section containing information necessary to decode the transmitted data.

11. The method of claim 1, further comprising the step of transmitting the data in a format including a data section and a section containing information necessary to decode the transmitted data, said information including the maximum requantization level.

12. The method of claim 1, further comprising the step of transmitting the data in a format including a data section and a section containing information necessary to decode the transmitted data, said information including the maximum requantization level and codes for decoding the transmitted data.

13. The method of claim 1, used in a two-dimensional or three-dimensional seismic survey in a land, marine, or transitional zone.

14. An apparatus for compressing seismic signal data, said apparatus comprising filtering and subsampling means for splitting said seismic signal data into a plurality of data subsets; and requantizing means for said data subsets using requantization levels depending on a subset number and time.

* * * * *